(12) United States Patent
Duplys et al.

(10) Patent No.: US 9,798,874 B2
(45) Date of Patent: Oct. 24, 2017

(54) DEVICE AND METHOD FOR PROCESSING DATA

(71) Applicant: Robert Bosch GmbH, Stuttgart (DE)

(72) Inventors: Paulius Duplys, Markgroeningen (DE); Robert Szerwinski, Esslingen (DE); Matthew Lewis, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/684,729

(22) Filed: Apr. 13, 2015

(65) Prior Publication Data
US 2016/0019386 A1    Jan. 21, 2016

(30) Foreign Application Priority Data

Apr. 16, 2014    (DE) .......... 10 2014 207 296

(51) Int. Cl.
| | |
|---|---|
| *G06F 11/30* | (2006.01) |
| *G06F 12/14* | (2006.01) |
| *G06F 21/55* | (2013.01) |
| *G06F 21/60* | (2013.01) |
| *G06F 21/72* | (2013.01) |
| *H03M 13/19* | (2006.01) |
| *H04L 9/30* | (2006.01) |

(52) U.S. Cl.
CPC .......... *G06F 21/55* (2013.01); *G06F 21/556* (2013.01); *G06F 21/602* (2013.01); *G06F 21/72* (2013.01); *H03M 13/19* (2013.01); *H04L 9/30* (2013.01)

(58) Field of Classification Search
CPC .......... G06F 21/572; G06F 21/10; G06F 8/65; G06F 21/57; G06F 21/575
USPC .......................................... 713/191
See application file for complete search history.

(56) References Cited

U.S. PATENT DOCUMENTS

| | | | |
|---|---|---|---|
| 6,904,110 B2 * | 6/2005 | Trans .......... | H04B 1/00 375/229 |
| 2002/0057446 A1 * | 5/2002 | Long .......... | G06F 9/3879 358/1.13 |
| 2003/0086515 A1 * | 5/2003 | Trans .......... | H04B 1/00 375/346 |
| 2005/0186933 A1 * | 8/2005 | Trans .......... | H04B 1/00 455/296 |
| 2014/0298458 A1 * | 10/2014 | Lewis .......... | H04L 63/1475 726/22 |

(Continued)

*Primary Examiner* — Kambiz Zand
*Assistant Examiner* — Stephen Sanders
(74) *Attorney, Agent, or Firm* — Norton Rose Fulbright US LLP; Gerard Messina

(57) ABSTRACT

A device for processing data includes: an input interface receiving input data; a processing unit processing data; and an encoding unit encoding data words which are obtained as input data at the input interface data in order to obtain encoded data words, the data words being encoded in such a way that a predefined portion of measured values which characterize the encoded data words and/or their processing by the device and which are ascertainable as a function of at least one physical variable of the device has a difference from a default value, the difference being less than or equal to a predefinable threshold value. The encoding unit executes an encoding rule for encoding the data words as a function of at least one encoding parameter, and the processing unit processes the encoded data words.

10 Claims, 6 Drawing Sheets

(56) References Cited

U.S. PATENT DOCUMENTS

2014/0298459 A1* 10/2014 Lewis .................. G06F 21/556
726/22

* cited by examiner

| S1 | S2 | S3 | S4 |
|---|---|---|---|
| 0000 | 0000 | 0 | 11 |
| 0001 | 0001 | 0 | 10 |
| 0010 | 0010 | 0 | 10 |
| 0011 | 0011 | 0 | 00 |
| 0100 | 0100 | 0 | 10 |
| 0101 | 0101 | 0 | 00 |
| 0110 | 0110 | 0 | 00 |
| 0111 | 1000 | 1 | 00 |
| 1000 | 1000 | 0 | 10 |
| 1001 | 1001 | 0 | 00 |
| 1010 | 1010 | 0 | 00 |
| 1011 | 0100 | 1 | 00 |
| 1100 | 1100 | 0 | 00 |
| 1101 | 0010 | 1 | 00 |
| 1110 | 0001 | 1 | 00 |
| 1111 | 0000 | 1 | 10 |

Fig. 6A

| S1' | S2' | S3' | S4' |
|---|---|---|---|
| 0000 | 0000 | 11 | 0 |
| 0001 | 0001 | 10 | 0 |
| 0010 | 0010 | 10 | 0 |
| 0011 | 0011 | 00 | 0 |
| 0100 | 0100 | 10 | 0 |
| 0101 | 0101 | 00 | 0 |
| 0110 | 0110 | 00 | 0 |
| 0111 | 1000 | 00 | 1 |
| 1000 | 1000 | 10 | 0 |
| 1001 | 1001 | 00 | 0 |
| 1010 | 1010 | 00 | 0 |
| 1011 | 0100 | 00 | 1 |
| 1100 | 1100 | 00 | 0 |
| 1101 | 0010 | 00 | 1 |
| 1110 | 0001 | 00 | 1 |
| 1111 | 0000 | 10 | 1 |

Fig. 6B

DEVICE AND METHOD FOR PROCESSING DATA

BACKGROUND OF THE INVENTION

1. Field of the Invention

The present invention relates to a device for processing data, the device including an input interface for receiving input data, and a processing unit for processing data. Moreover, the present invention relates to a method for operating a device of this type.

BRIEF SUMMARY OF THE INVENTION

The object of the present invention is to improve a device and a method of the above-mentioned type in such a way that increased security against attacks, in particular side channel attacks, is provided.

In the device of the above-mentioned type, this object is achieved according to the present invention in that an encoding unit is provided which is designed for encoding data words which are obtained as input data at the input interface in order to obtain encoded data words, the encoding unit being designed for encoding the data words in such a way that a predefinable portion of measured values which characterizes the encoded data words and/or their processing by the device and which are ascertainable as a function of at least one physical variable of the device, preferably at least approximately 50% of all measured values, have a difference from a default value, the difference being less than or equal to a predefinable threshold value, the encoding unit also being designed for executing an encoding rule for encoding the data words as a function of at least one encoding parameter, the processing unit being designed for processing the encoded data words.

According to the present invention, it has been found that side channel attacks on the device according to the present invention may be made more difficult or impossible when the data words to be processed are encoded according to the principle provided herein. It is generally known that side channel attacks are applied to certain implementations of data processing devices or processes, such as implementations of cryptographic algorithms and the like, use being made of the fact that one or multiple observable or measurable physical variables of the device are a function of the processed data, and thus allow conclusions to be drawn concerning the processed data, such as a secret cryptographic key and the like.

Thus, within the scope of a side channel attack, the above-mentioned measured values, for example, which represent the encoded data words and/or which characterize processing of these encoded data words by the device, may be detected by measurement, and from these measured values an attacker may attempt to obtain information about the data actually processed.

According to the present invention, it has been found that it is possible to provide an encoding of the data words prior to their processing in such a way that a side channel attack on the device is made more difficult. The principle according to the present invention is based on the fact that the encoding is carried out with the aim that the measured values to be ascertained for the side channel attack are less "distinctive," i.e., have a lower correlation with the data actually processed. In other words, the encoding according to the present invention provides that the data actually processed, namely, the encoded data words, are adapted to the specific implementation of the device (compared to the unencoded data words) in such a way that measured values used for a side channel attack have a lower information content or a lower correlation with respect to the processed data words. This type of encoding may also be referred to as so-called leakage-preserving code, since in the cryptographic sense it reduces or prevents leakage.

According to the present invention, the option is also advantageously provided for executing an encoding rule for encoding the data words as a function of at least one encoding parameter, side channel attacks advantageously being made even more difficult by changing the encoding parameter.

Moreover, the object stated above is achieved by a device for processing data, an encoding unit being provided which is designed for encoding data words which are obtained as input data at the input interface in order to obtain encoded data words, the encoding unit being designed for encoding the data words in such a way that a predefinable portion of all encoded data words, preferably at least approximately 50% of all encoded data words, have a predefinable Hamming distance and/or a predefinable Hamming weight among each other, the encoding unit being designed for executing an encoding rule for encoding the data words as a function of at least one encoding parameter, and the processing unit being designed for processing the encoded data words. In turn, the encoding parameter advantageously allows a variation of the encoding process, thus advantageously making side channel attacks even more difficult.

In one preferred specific embodiment, it is provided that the encoding parameter(s) is/are varied over time. A variation as a function of the processed data or data to be encoded and/or of time is likewise conceivable.

In one preferred specific embodiment, it is provided that the default value is selected to be equal for all measured values, which allows simple ascertainment of a particular code.

In one particularly preferred specific embodiment, an average value of all possible values over the measured values is selected as the default value. In this sense, "all possible values of the measured values" is understood to mean the quantity of all measured values which results during the processing of all encoded data words which are provided by the encoding according to the present invention. In one specific implementation of the device according to the present invention, the quantity of all possible measured values may be ascertained in a test setup, for example, in that for a given encoding, the device carries out data processing in such a way that each encoded data word is supplied once to the processing unit for processing. During the processing of a corresponding data word, a certain measured value is accordingly obtained which characterizes the data word or the processing of the data word in the device. As the result of one specific embodiment, the measured values thus obtained may be ascertained, and lastly, their average value, for example, may be used as the default value for the encoding according to the present invention. For example, the encoding according to the present invention, i.e., an association of encoded data words with unencoded data words, may also be ascertained in steps. This association may be made in an iterative process, for example, in order to gradually refine the encoded data words or the transformation which is made by the encoding unit according to the present invention within the scope of the encoding, until a difference of one or multiple certain measured values from the default value meets the threshold value criterion according to the present invention. It is then ensured that the measured values, which are derivable from the data words encoded in this way, differ only slightly from the default value, so that a side channel attack which is conducted by evaluating the measured values or values derived therefrom is made significantly more difficult or is made impossible.

It is particularly advantageous that the principle according to the present invention is not based on the use of random numbers or pseudorandom numbers, and also requires no entropy source. Rather, the encoding according to the present invention, also when the at least one encoding parameter is used, represents a deterministic rule for transforming the data to be processed into the encoded data words. A particular encoding may preferably be ascertained and used for each specific implementation of the device, appropriate variants being selectable with the aid of the encoding parameter(s). It is also conceivable to ascertain multiple possible encodings for a specific implementation of the device, and to change these during operation of the device, thus further increasing the security against side channel attacks.

In another advantageous specific embodiment, it is provided that the default value is not selected to be equal for all measured values. As a result of the specific embodiment in question, this means that the encoding according to the present invention provides degrees of freedom in such a way that different default values are provided for different measured values. For example, asymmetries may thus advantageously be taken into account in the implementation or in obtaining the measured values. It is conceivable, for example, that during the processing of a first group of encoded data words, measured values are obtainable which have a higher information content with regard to the processed data than for the processing of a second group of encoded data words. In this case, it may be advantageous to provide different default values for the different groups of encoded data words in order to reduce or compensate for these asymmetries, preferably with the aim that all possible measured values have a similar information content with regard to the processed data, regardless of the asymmetries.

In another advantageous specific embodiment, it is provided that in each case a different threshold value is provided for at least two measured values or data words associated with these measured values. An additional degree of freedom with regard to the encoding may thus be provided which allows the transformation according to the present invention, on which the encoding is based, to be more easily found.

In another advantageous specific embodiment, the measured values are scalar or vectorial variables, or have a matrix form. For example, the measured values may represent an electrical energy consumption of the device or of at least one component of the device. In this case, an attacker of the device may ascertain this electrical energy consumption as a measured value within the meaning of the present invention in order to carry out a side channel attack. In this specific application, the encoding according to the present invention of the encoded data words which are ultimately processed in the processing unit has the advantageous effect that the corresponding measured values for the electrical energy consumption of the device or of the at least one component differ only slightly from one another, thus once again making a side channel attack more difficult.

One example of measured values in vectorial form is an application scenario in which multiple electrical energy consumption values of different components or, in general, parts of the device, are ascertained for each processed encoded data word. Of course, such a plurality of measured values may also be organized in matrix form. Another example in which a representation of measured values in matrix form appears to be advantageous is the ascertainment of electromagnetic fields radiated from the device. In this case, for example, a plurality of field probes which are used for measuring the electromagnetic fields may be placed over this device when it is in operation, and appropriate measured values of the individual field probes may be associated, for example, with individual matrix elements of a measured value, within the meaning of the present invention, which is present in matrix form.

Depending on the form of the measured values within the meaning of the present invention, the comparison operation for ascertaining the difference of the measured values from the default value is also to be appropriately selected. The same applies for the default value. For example, for scalar variables, a simple difference formation with subsequent absolute value formation may be provided in order to evaluate a difference between a measured value, for example a value for the electrical energy consumption of the device, and a corresponding default value. For vectorial or matrix-form variables, other suitable functions may similarly be defined for the measured values in order to define the applicable difference from a default value (for example, a default vector, default matrix, and the like).

In general, as the result of one specific embodiment, within the meaning of the present invention the term "measured values" may also be understood to mean variables which are derived from physical measured values. For example, a Hamming distance or a Hamming weight, which is derived from one or multiple measured values of the device, represents a "measured value" within the meaning of the present invention. This means that when the present invention is appropriately carried out, the encoding may also be designed in such a way that the measured values, which correspond to values which are not directly physically detectable, but, rather, values which are derived therefrom, meet the threshold value criterion according to the present invention. This means that the encoding according to the present invention may also be carried out in such a way that the encoded data words or their processing is/are represented not directly by the physical measured values which meet the threshold value criterion according to the present invention, but, rather, by the variables derived therefrom, such as the Hamming distance or the Hamming weight.

In another specific embodiment, the encoding unit is designed for encoding the data words in such a way that a predefinable portion of all encoded data words, preferably at least approximately 50% of all encoded data words, have a predefinable Hamming distance and/or a predefinable Hamming weight among each other. According to the present invention, it has been found that the transformation of the data words obtained on the input side with the aid of the provided encoding, which defines criteria with regard to the Hamming distance or Hamming weight, results in less leakage of information concerning the processed data within the processing unit according to the present invention, and in particular may also contribute to meeting the threshold value criterion according to the present invention for the measured values.

In the present specific embodiment, the phrase "all encoded data words" is preferably understood to mean the quantity of all theoretically occurring encoded data words. If, for example, j data words obtained on the input side exist, the encoding unit may correspondingly associate j encoded data words with these j data words obtained on the input side. In one specific embodiment, the encoding preferably takes place in such a way that at least approximately 50% of the j encoded data words have a predefinable Hamming distance among each other. Alternatively or additionally, the encoding may preferably also take place in such a way that at least approximately 50% of the j encoded data words have a predefinable Hamming weight.

In one advantageous specific embodiment, it is provided that the processing unit includes at least one register which is designed for at least temporarily storing at least one encoded data word. This means that one simple specific embodiment of the present invention relates to a device which includes an input interface and an encoding unit according to the present invention, and in which the processing according to the present invention provides at least temporary storage in the register. Thus, in this specific embodiment, one data word encoded according to the present invention (or also multiple encoded data words) is/are at least temporarily stored in a register or some other memory, in particular in the encoded form, so that subsequent reading out of the encoded data words and further processing are possible. For example, a subsequent cryptographic process may read out the appropriate register and further process the data. Alternatively or additionally, the processing unit according to the present invention may also include at least one cryptographic unit which is designed for carrying out at least a portion of a cryptographic process. For example, the processing unit may include a cryptographic unit which is designed for carrying out the entire advanced encryption standard (AES) algorithm.

In another specific embodiment, it may be provided that the processing unit includes a cryptographic unit which is designed for carrying out a portion of a cryptographic process (or an entire cryptographic process), for example for carrying out a nonlinear substitution operation, which is also the objective of the so-called SubBytes( ) function of the AES cryptography standard (see http://csrc.nist.gov/publications/fips/fips197/fips-197.pdf, Section 5.1.1).

In another specific embodiment, it may be provided that the processing unit includes a data bus or is designed as a data bus, in particular as a parallel data bus. In this case, the encoding according to the present invention protects data transmission via the data bus from side channel attacks.

In another advantageous embodiment, it is provided that the encoding unit is designed for encoding the data words by adding a predefinable number of bits to each data word. The value of the correspondingly added bits may thus be selected depending on the encoding according to the present invention. In other words, by the addition according to the present invention of a predefinable number of bits (and selection of their particular value), a number of degrees of freedom may be provided for the encoding according to the present invention which allows a desired Hamming weight and/or desired Hamming distance to be set for one or multiple encoded data words. The actual information in the unencoded data words is not lost in the process, since only new bits are added according to the present invention. Alternatively or additionally, further bits may optionally be added in order to meet the threshold value criterion according to the present invention for the measured values with regard to the default value. In one specific embodiment, the addition of the predefinable number of bits and/or their value may be carried out as a function of the at least one encoding parameter provided according to the present invention.

In another advantageous specific embodiment, it is provided that the encoding unit is designed for selecting the predefinable number of added bits or their values in such a way that the predefinable portion of all encoded data words has the predefinable Hamming distance and/or the predefinable Hamming weight among each other.

The Hamming distance refers to the number of different positions of two code words which are compared to one another. For a binary code and two code words in question, the Hamming distance thus corresponds to the number of different bit positions of the compared code words. The Hamming weight is understood to mean the Hamming distance from the zero vector. For a binary code, the Hamming weight thus corresponds to the number of positions in the code word under consideration which are different from zero, i.e., the number of bits having the value one.

In another advantageous specific embodiment, it is provided that the device is designed, at least in part, as an integrated circuit (IC), preferably implemented with the aid of complementary metal oxide semiconductor (CMOS) technology. The functionality according to the present invention may also be implemented in an ASIC or FPGA, for example.

Examples of specific embodiments of the present invention are explained below with reference to the drawing.

BRIEF DESCRIPTION OF THE DRAWINGS

FIGS. 6A and 6B schematically show tables for illustrating an encoding according to one specific embodiment.

DETAILED DESCRIPTION OF THE INVENTION

Figure 1:
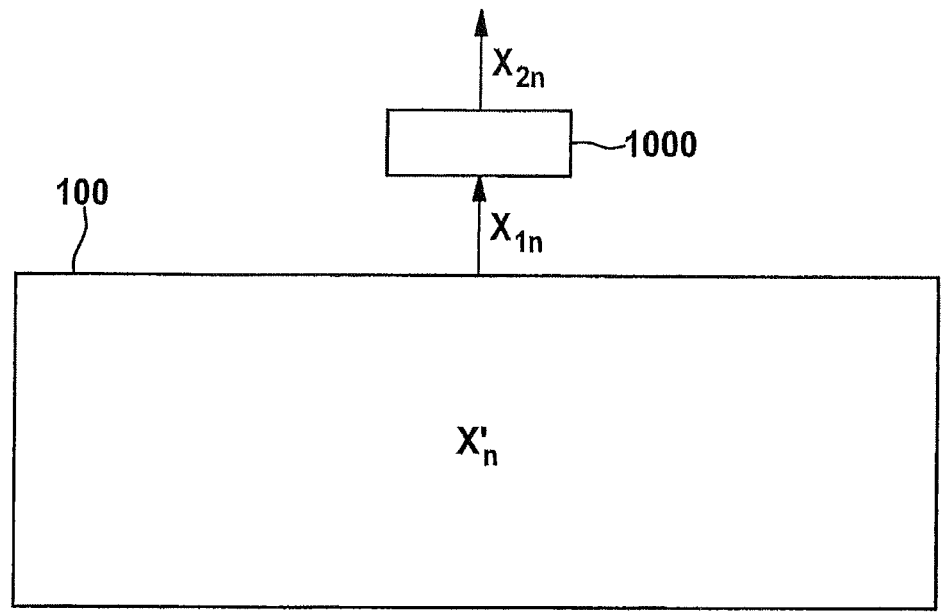
FIG. 1 schematically shows one specific embodiment of a device according to the present invention.

FIG. 1 schematically shows one specific embodiment of a device 100 according to the present invention for processing data. Device 100 is designed, for example, as an integrated circuit (IC), using CMOS technology, for example.

During processing of the data in device 100, measured values X1n are ascertainable which represent data words Xn' which are being processed in device 100 at that moment. These measured values may be obtained using methods known per se for ascertaining physical variables. For example, an electrical energy consumption of device 100 or of individual components thereof may be obtained as measured value X1n. In this case, a corresponding electrical energy measured value X1n may be obtained for the processing of each data word Xn' within device 100. As an alternative to electrical energy consumption, when the operating voltage of device 100 is known, a current consumption, and the like, for example, is usable as the measured value. The current consumption may be derived, for example, from a voltage drop, detected by measurement, across a shunt resistor (low-resistance measuring shunt, not shown) which is connected in series to an electrical supply line (not shown) of device 100. As an alternative to electrical energy measured values or current measurement and the like, measured values may be obtained, for example, by detecting electrical fields of device 100, magnetic fields of device 100, or electromagnetic fields of device 100 or combinations thereof. Of course, when there is a suitable spatial resolution of the measuring process used, in each case the measurement may also be based on only one component of device 100. For example, when device 100 is designed as an integrated circuit, it may be of interest to obtain in a targeted manner measured values X1n of those components or areas of device 100 which contain the component to be attacked with the aid of a side channel attack, such as an AES core or the like, and which carry out, for example, a cryptographic process or a portion thereof.

In one advantageous specific embodiment, the measured values are scalar variables (for example, a measured current value) or vectorial variables (for example, multiple measured current values of different circuit components), or have a matrix form.

Within the meaning of the present invention, in addition to the values which are ascertainable by physical detection, measured values are also understood to mean those values X2n which are derivable from the physically ascertainable values X1n, for example using computation methods, etc. For example, an attacker may provide a measuring or processing unit 1000 which detects one or multiple physical variables X1n of device 100, and which forms values X2n which are derived therefrom.

Within the meaning of the present invention, these derived values X2n are also referred to as measured values. These derived values X2n may be a Hamming distance or a Hamming weight, etc. This may be the case, for example, when electromagnetic radiation of individual bus lines of a parallel data bus is detected with the aid of device 1000. In this case, for example, one measured value is obtained for each bus line, and for eight, for example, bus lines a total of eight measured values X1n are available from which, with the aid of device 100 for example, a Hamming distance from other measured values X2n obtained in the same way, or a Hamming weight, may be formed.

According to the present invention, it is provided that device 100 includes an encoding unit 130 (see FIG. 2A) which is designed for encoding data words Xn which are obtained as input data X at an input interface 110 in order to obtain encoded data words Xn', and that a processing unit 120 of device 100 is designed for processing encoded data words Xn'. As a result, measured values X1n, X2n (FIG. 1), which are ascertainable in the course of side channel attacks, for example, are advantageously a function of encoded data words Xn' or the processing of encoded data words Xn' in device 100, and are not directly a function of unencoded data words Xn which are supplied to encoding unit 130 according to the present invention. Accordingly, for a suitable selection of the encoding, it is advantageously achieved that measured values X1n, X2n are less meaningful with regard to encoded data Xn' instantaneously processed by device 100, thus making the side channel attacks more difficult or impossible.

Furthermore, it is provided according to the present invention that encoding unit 130 is designed for executing an encoding rule for the encoding of data words Xn as a function of at least one encoding parameter t_i. In particular, according to one specific embodiment it may be provided that a polymorphous control unit 132 is provided which is designed for specifying the at least one encoding parameter t_i for encoding at least one data word Xn, but preferably for encoding multiple or all data words Xn. In other words, due to encoding parameter t_i according to the present invention, at least one additional degree of freedom in the mapping of data words Xn onto the encoded data words Xn', i.e., for the encoding, is provided which further increases the security of device 100 and the data processed therein. In one specific embodiment, polymorphous control unit 132, which forms and/or provides the at least one encoding parameter t_i, is integrated into device 100 (see FIG. 2A). In one specific embodiment, polymorphous control unit 132 is implemented using linear functions. In another specific embodiment, polymorphous control unit 132 is implemented using nonlinear functions. As the result of further specific embodiments, combinations thereof are likewise possible.

In particular, in one specific embodiment it is provided that encoding unit 130 is designed for encoding data words Xn in such a way that a predefinable portion of all measured values X1n, X2n, preferably at least approximately 50% of all measured values X1n, X2n, have a difference from a default value Vn (FIG. 2B) which is less than or equal to a predefinable threshold value S. Investigations by the applicant have shown that for this type of encoding and during the processing of encoded data words Xn' in processing unit 120, the corresponding technically detectable variables (measured values X1n) or variables X2n which are derivable therefrom are less meaningful with regard to their information content concerning unencoded data words Xn, so that effective protection against side channel attacks is provided by the encoding according to the present invention. The security is advantageously increased even further by using the at least one encoding parameter t_i in the encoding.

The encoding according to the present invention is therefore also referred to as so-called polymorphic leakage-resilient code PLRC because it reduces or prevents leakage in the cryptographic sense, using, among other things, the polymorphous encoding principle with the aid of the at least one encoding parameter t_i.

In contrast to methods which are based on the use of random numbers or pseudorandom numbers for making side channel attacks more difficult and which are correspondingly complicated, the principle according to the present invention advantageously requires only a deterministic method, namely, the encoding with the aid of encoding unit 130, using the at least one encoding parameter t_i and the processing of the encoded data.

In one specific embodiment, input data X (FIG. 2A) may be present, for example, as chronologically successive digital data words, such as data words Xn having a data width of four bits, for example. Other data widths are likewise possible. Accordingly, input interface 110 relays input data X in the form of data words Xn to its output.

Figure 2A:
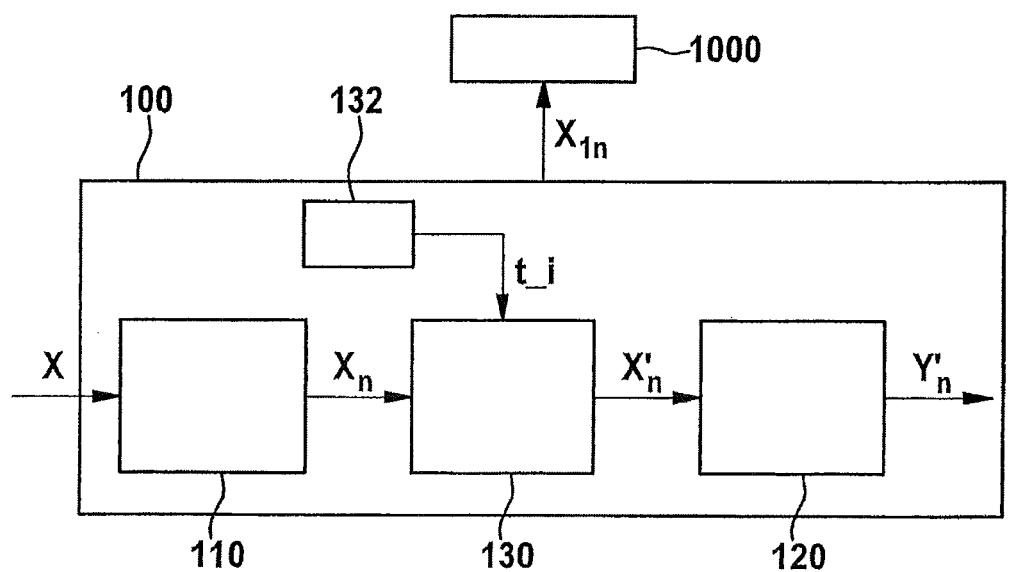
FIGS. 2A and 2B each schematically show one specific embodiment of a device according to the present invention.

As is apparent from FIG. 2A, encoded data words Xn' are output at the output of encoding unit 130 and supplied to processing unit 120 for processing. Accordingly, processing unit 120 outputs processed encoded data words Yn' at its output.

Figure 2B:
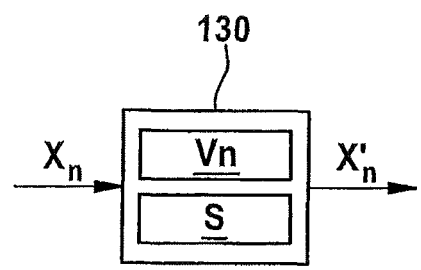

FIG. 2B shows an encoding unit 130 according to one specific embodiment. Encoding unit 130 advantageously has a predefinable default value V and a predefinable threshold value S for evaluating measured values X1n, X2n, so that it may be checked whether an instantaneous encoding already meets the threshold value criterion according to the present invention with regard to the difference of at least one measured value X1n, X2n from default value V. In the variant according to FIG. 2B, polymorphous control unit 132 may likewise be provided and situated in encoding unit 130, for example, but is not illustrated there for reasons of clarity.

In one particularly preferred specific embodiment, an average value over all possible values of measured values X1n or X2n is selected as default value V. In this sense, "all possible values of the measured values" is understood to mean the quantity of all measured values X1n or X2n which results during the processing of all encoded data words Xn' which are provided by the encoding according to the present invention. The quantity of all possible measured values may be ascertained, for example, in a test setup in one specific implementation of device 100 according to the present invention, in that for a given encoding, data processing by device 100 or its unit 120 takes place in such a way that each encoded data word Xn' is supplied once to processing unit 120 for processing. During the processing of a corresponding encoded data word Xn', a certain measured value X1n or X2n is accordingly obtained which characterizes data word Xn' or the processing of the data word in the device. As the result of one specific embodiment, the measured values thus obtained may be ascertained, and lastly, for example, their average value may be used as the default value for the encoding according to the present invention. For example, the encoding according to the present invention, i.e., an association of encoded data words with unencoded data words, may also be ascertained in steps. This association may be made in an iterative process, for example, in order to gradually refine the encoded data words or the transformation which is made by the encoding unit according to the present invention within the scope of the encoding, until a difference of one or multiple certain measured values from the default value meets the threshold value criterion according to the present invention. It is then ensured that measured values X1n or X2n, which are derivable from data words Xn' encoded in this way, differ only slightly from the default value, in such a way that a side channel attack which is conducted by evaluating measured values X1n, X2n is made significantly more difficult or is made impossible.

It is particularly advantageous that the principle according to the present invention is not based on the use of random numbers or pseudorandom numbers. Rather, the encoding according to the present invention represents a deterministic rule for transforming the data to be processed into the encoded data words. A particular encoding may preferably be ascertained and used for each specific implementation of device 100. It is also conceivable to ascertain multiple possible encodings for a specific implementation of the device, and to change these during operation of the device, thus further increasing the security against side channel attacks.

In another advantageous specific embodiment, it is provided that default value V (FIG. 2B) is not selected to be equal for all measured values X1n, X2n. This means that the encoding according to the present invention of the specific embodiment in question provides degrees of freedom in such a way that different default values are provided for different measured values. For example, asymmetries may thus advantageously be taken into account in the implementation or in obtaining the measured values. It is conceivable, for example, that during the processing of a first group of encoded data words, measured values are obtainable which have a higher information content with regard to the processed data than for the processing of a second group of encoded data words. In this case, it may be advantageous to provide different default values for the different groups of encoded data words in order to reduce or compensate for these asymmetries, preferably with the aim that all possible measured values have a similar information content with regard to the processed data, regardless of the asymmetries.

In another advantageous specific embodiment, it is provided that in each case a different threshold value S is provided for at least two measured values or data words associated with these measured values. An additional degree of freedom with regard to the encoding may thus be provided which allows the transformation according to the present invention, on which the encoding is based, to be more easily found.

In another advantageous specific embodiment, measured values X1n, X2n are scalar variables or vectorial variables, or have a matrix form. For example, the measured values may represent an electrical energy consumption of the device or of at least one component of the device. In this case, an attacker of the device may ascertain this electrical energy consumption as a measured value within the meaning of the present invention in order to carry out a side channel attack. In this specific application, the encoding according to the present invention of the encoded data words which are ultimately processed in the processing unit has the advantageous effect that the corresponding measured values for the electrical energy consumption of the device or of the at least one component differ only slightly from one another, thus once again making a side channel attack more difficult.

One example of measured values in vectorial form is an application scenario in which multiple electrical energy consumption values of different components or, in general, parts of device 100, are ascertained for each processed encoded data word. Of course, such a plurality of measured values may also be organized in matrix form. Another example in which a representation of measured values in matrix form appears to be advantageous is the ascertainment of electromagnetic fields radiated from the device. In this case, for example, a plurality of field probes which are used for measuring the electromagnetic fields may be placed over this device when it is in operation, and appropriate measured values of the individual field probes may be associated, for example, with individual matrix elements of a measured value, within the meaning of the present invention, which is present in matrix form.

Depending on the form of the measured values within the meaning of the present invention, the comparison operation for ascertaining the difference of the measured values from the default value of course is also to be appropriately selected. The same applies for the default value. For example, for scalar variables a simple difference formation with subsequent absolute value formation may be provided in order to evaluate a difference between a measured value, for example a value for the electrical energy consumption of the device, and a corresponding default value. For vectorial or matrix-form variables, other suitable functions may similarly be defined for the measured values in order to define the applicable difference from a default value (for example, a default vector, default matrix, and the like).

In another preferred specific embodiment, encoding unit 130 is designed for encoding data words Xn in such a way that all encoded data words Xn' have a predefinable Hamming distance among each other. Alternatively or additionally, it may be provided that the encoding takes place in such a way that all encoded data words Xn' have a predefinable Hamming weight. In this variant as well, the security may be increased by using the at least one encoding parameter t_i (FIG. 2A) for providing a PLRC.

Other variants of the encoding by encoding unit 130 are likewise conceivable, which means that the present invention is not limited to an encoding of input data words Xn with the aim of achieving the predefinable Hamming distance or the predefinable Hamming weight. In this variant as well, the security may be increased by using the at least one encoding parameter t_i (FIG. 2A) for providing a PLRC.

Figure 3A:
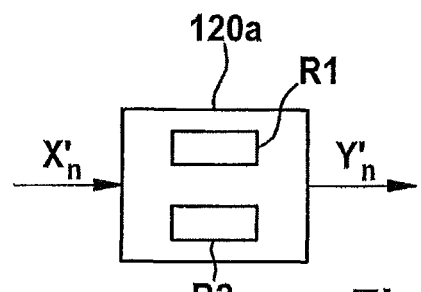
FIGS. 3A and 3B each schematically show one specific embodiment of a processing unit according to the present invention.

As the result of one preferred specific embodiment, processing unit 120 may be a register, for example. FIG. 3A shows another specific embodiment in which a variant 120a of processing unit 120 according to FIG. 2A is depicted.

Processing unit 120a includes two registers R1, R2 which are designed for at least temporarily storing encoded data words Xn' which are obtained from encoding unit 130 and supplied to the registers on the input side. At an appropriate time, processing unit 120a outputs the encoded data words which are stored in registers R1, R2 as "processed" encoded data Yn' via an output for further processing. In the present case, there is the special feature that, due to the design of processing unit 120a as strictly a memory, output data words Yn' of unit 120a correspond to input data words Xn'.

Figure 3B:
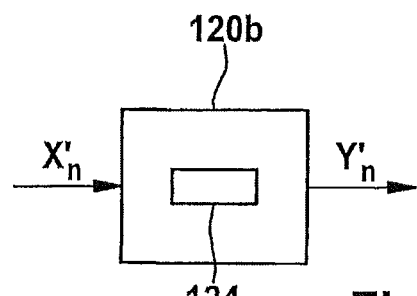

FIG. 3B shows another specific embodiment 120b for a processing unit according to the present invention. In the present case, processing unit 120b includes a cryptographic unit 124 which, for example, may be a unit for executing a portion of an algorithm of an encryption process. For example, cryptographic unit 124 may be designed for carrying out a nonlinear substitution operation using input data Xn' supplied to it, and obtaining corresponding output data Yn'. This type of nonlinear substitution operation is provided, for example, in the so-called SubBytes( ) function of the advanced encryption standard (AES). Accordingly, a variant of the present invention according to FIG. 3B may be used for executing the applicable portions of the AES algorithm.

In yet another specific embodiment, processing unit 120 may be a data bus (serial or parallel), or in general may be a circuit component to which encoded data words Xn' are suppliable. In yet another specific embodiment, components 120 and 130 are also functionally combinable with one another.

Figure 4A:
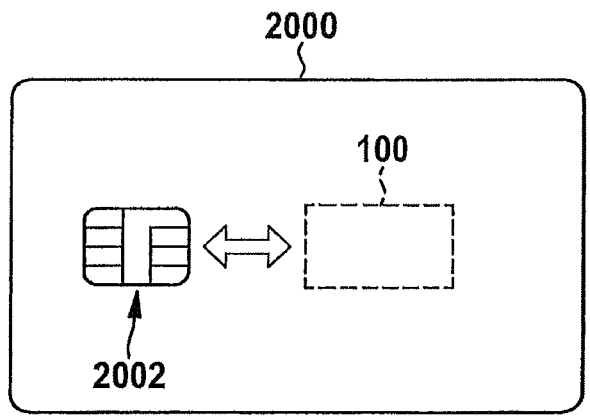
FIGS. 4A and 4B schematically show units which include a device according to the present invention.

FIG. 4A shows another field of application of the present invention. A chip card 2000 is depicted on which a device 100 according to the present invention is situated. Device 100 is in data connection with interface means 2002, via which chip card 2000 or device 100 contained therein may exchange data, in a manner known per se, with external units such as a chip card reader (not shown) or the like.

Device 100 according to FIG. 4A advantageously has at least the structure depicted in FIG. 2A; it is also conceivable to provide multiple encoding units 130 or multiple identical or different processing units 120, 120a, 120b within a device 100, as the result of which appropriate method steps of a data processing method which is implemented in device 100 may make use of the advantages according to the present invention.

Figure 4B:
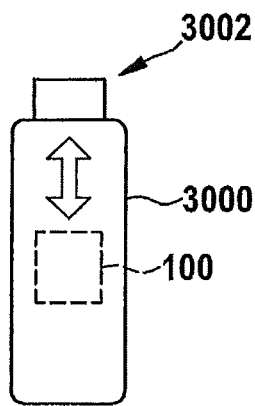

FIG. 4B shows another application of the present invention. A universal serial bus (USB) memory data carrier 3000 which includes a device 100 according to the present invention and USB connection means 3002 is depicted.

Figure 5:
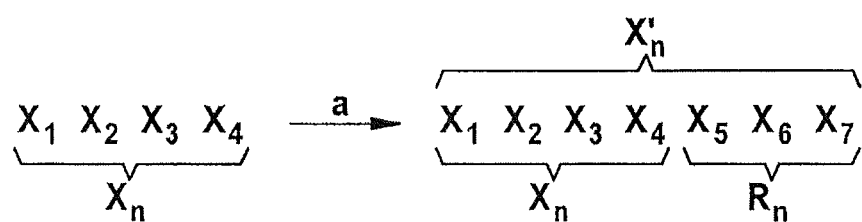
FIG. 5 schematically shows an example of one specific embodiment of an encoding according to the present invention.

FIG. 5 shows an example of an encoding according to the present invention, with reference to a data word Xn which contains four bits (corresponding to one nibble ("half-byte")). In FIG. 5, a first bit of data word Xn is denoted by reference numeral X1, a second bit is denoted by reference numeral X2, a third bit is denoted by reference numeral X3, and a fourth bit is denoted by reference numeral X4.

Accordingly, the following notation is also suitable for representing data word Xn: (x1, x2, x3, x4), which corresponds to the sequence of individual bits x1, x2, x3, x4 of data word Xn.

Data word Xn according to FIG. 5 is converted into an encoded data word Xn' by an encoding with the aid of encoding unit 130 (FIG. 2A); see arrow a from FIG. 5. As is apparent from FIG. 5, encoded data word Xn', as before, has four bits x1, x2, x3, x4 of original data word Xn, as well as three additional bits x5, x6, x7. In the present case, encoding a is thus achieved by appending a bit sequence Rn, which has a length of three bits here.

The values of individual bits x5, x6, x7 of bit sequence Rn, appended within the scope of the encoding according to the present invention, may advantageously be selected, for example, in such a way that a desired Hamming distance of encoded data word Xn' from other encoded data words or a desired Hamming weight for encoded data word Xn' is obtained. In this variant as well, the security may be increased by using the at least one encoding parameter t_i (FIG. 2A) for providing a PLRC. For example, the particular value of the at least one encoding parameter t_i which is specified by polymorphous control unit 132 (FIG. 2A) may control the selection of a variant of possible encoding algorithms of encoding unit 130, so that different data words Xn,i are encoded with different encoding variants in each case.

FIG. 6A shows an example of an encoding table containing four columns S1, S2, S3, S4, which is usable, for example, in encoding unit 130 (FIG. 2A) according to one specific embodiment. Column S1 contains input data words Xn in binary notation with values of 0000 (i.e., decimal zero) to 1111 (i.e., decimal 15). Columns S2, S3, S4 in each case together form an encoded data word Xn'. Second column S2 contains the useful data words (payload) containing four bits. Column S3 of the table depicted in FIG. 6A contains one inversion bit of a first encoding rule used as an example, and column S4 contains two compensation bits of the first encoding rule used. As an example, encoded data word Xn'=0001010 is thus assigned to input data word Xn=0001 by the table according to FIG. 6A, and so forth.

FIG. 6B shows an example of another encoding table containing four columns S1', S2', S3', S4', which is usable, for example, in encoding unit 130 (FIG. 2A) according to one specific embodiment. Column S1' contains input data words Xn in binary notation with values of 0000 (i.e., decimal zero) to 1111 (i.e., decimal 15), and in this respect is identical to column S1 of the table according to FIG. 6A. Columns S2', S3', S4' of the table according to FIG. 6B in each case together form an encoded data word Xn'. Second column S2' contains the useful data words (payload) containing four bits. Column S3' of the table depicted in FIG. 6B contains two compensation bits of a second encoding rule used as an example, and column S4' contains one inversion bit of the second encoding rule used as an example.

As is apparent from a comparison of the tables according to FIGS. 6A, 6B, columns S3, S4 correspond to columns S4', S3', respectively, and therefore these columns are interchanged for implementing the different encoding rules.

For example, encoding parameter t_i according to the present invention or its value may be used to control encoding unit 130 to use the encoding table according to either FIG. 6A or FIG. 6B for an input data word Xn to be encoded. In this case, a single bit is sufficient for encoding parameter t_i. The flexible changing between the two encoding variants or tables, which are examples in the present case, and which is made possible by encoding parameter t_i according to the present invention, greatly increases the security of device 100 (FIG. 2A) against DPA attacks.

The example described in the present case with reference to FIGS. 6A, 6B is used for the simple explanation of polymorphous leakage-resilient code PLRC according to the present invention. It is understood that more than two different encoding variants are controllable by encoding parameter t_i according to the present invention. In addition, encoding rules which are more complex than those depicted as an example may be used, for example, codes which allow the scalability and/or variable encoding density or encoding rate, error recognition, error correction, etc.

Encoded data words Xn' according to FIG. 6A may be obtained from the sixteen data words Xn, for example using the following equations or formation rules:

$$c = \begin{cases} (\bar{x}, 1, w(\bar{x}, 1), w(\bar{x}, 1, 1)), & \text{when } HW(x) > 2 \\ (\bar{x}, 0, w(x, 0), w(x, 0, 1)) & \text{otherwise} \end{cases}, \quad \text{(Equation 1)}$$

where c corresponds to a 7-bit code word, x corresponds to a 4-bit code word (x0, x1, x2, x3), corresponds to a bitwise complement, "," indicates a bitwise concatenation (sequence), HW(.) indicates the Hamming weight of a data word, and the following applies for function w:

$$w(x) = \begin{cases} 1, & \text{when } HW(x) < 2 \\ 0 & \text{otherwise} \end{cases}, \quad \text{(Equation 2)}$$

For data word Xn=x=1111, for example the top line of equation 1 is to be used since the Hamming weight of data word "1111" under consideration is greater than two, so that c=0000110 is obtained as the corresponding 7-bit code word, and so forth.

Encoded data words Xn' according to FIG. 6B may be obtained from the sixteen data words Xn, for example using the following equations or formation rules:

$$c = \begin{cases} (\bar{x}, w(\bar{x}, 1, 1), w(\bar{x}, 1), 1), & \text{when } HW(x) > 2 \\ (x, w(x, 0, 1), w(x, 0), 0) & \text{otherwise} \end{cases}, \quad \text{(Equation 3)}$$

where c corresponds to a 7-bit code word, x corresponds to a 4-bit code word (x0, x1, x2, x3), corresponds to a bitwise complement, "," indicates a bitwise concatenation (sequence), HW(.) indicates the Hamming weight of a data word, and equation 2 above applies for function w. Equations 1, 3 thus represent different variants of an encoding which is usable by controlling encoding parameter t_i according to the present invention by encoding unit 130. This means that encoding unit 130 may use either equations 1 and 2 or equations 3 and 2 as a function of the value of encoding parameter t_i for the encoding of a data word Xn in question.

According to another specific embodiment, an algorithm, given below in pseudocode, may be used for decoding the encoding according to FIG. 6A:

```
if invert bit == 1
    decoded_output invert_bitwise(codeword[0:3])
else
    decoded_output codeword[0:3]
end if
```

Thus, a check is initially made in line 1 of the pseudocode as to whether the inversion bit of the encoded data word to be decoded is set, and if yes, the first four bits, inverted bitwise, are obtained as the decoded data word. If the inversion bit is not set, the first four bits of the encoded data word are directly obtained as the decoded data word.

The encoding variants according to the present invention, illustrated by the tables in FIGS. 6A, 6B, advantageously have the effect that all encoded data words have a constant Hamming weight (having the value two in the present case), as the result of which DPA attacks on device 100 are made more difficult, since, within the scope of the processing of data words Xn' encoded according to the present invention (FIG. 2A) in processing unit 120, for each code word the same number of state changes of the individual bits of encoded data words Xn' occur, so that specific combinations of state changes cannot be directly associated with specific code words which are being processed by unit 120 at that moment. Furthermore, according to the present invention a switch may be made between variants in FIGS. 6A, 6B, using encoding parameter t_i according to the present invention, for example between each nth data word to be encoded (value for n, for example, is 1, 2, 3 or greater, or is non-constant).

For achieving an 8-bit implementation based on the principle according to the present invention, the steps explained above and the encoding in the tables according to FIGS. 6A, 6B may be applied in each case to two half-bytes ("nibbles") which correspond to an 8-bit data word. For example, an 8-bit implementation of the SubBytes( ) function of the AES may be achieved in this way. The approach according to the present invention is also scalable very well, so that for a 32-bit implementation, for example, a data word 32 bits wide is initially split into eight half-bytes, preferably within one clock cycle, i.e., in parallel, and the eight half-bytes obtained therefrom may then be encoded according to the present invention.

Figure 7:
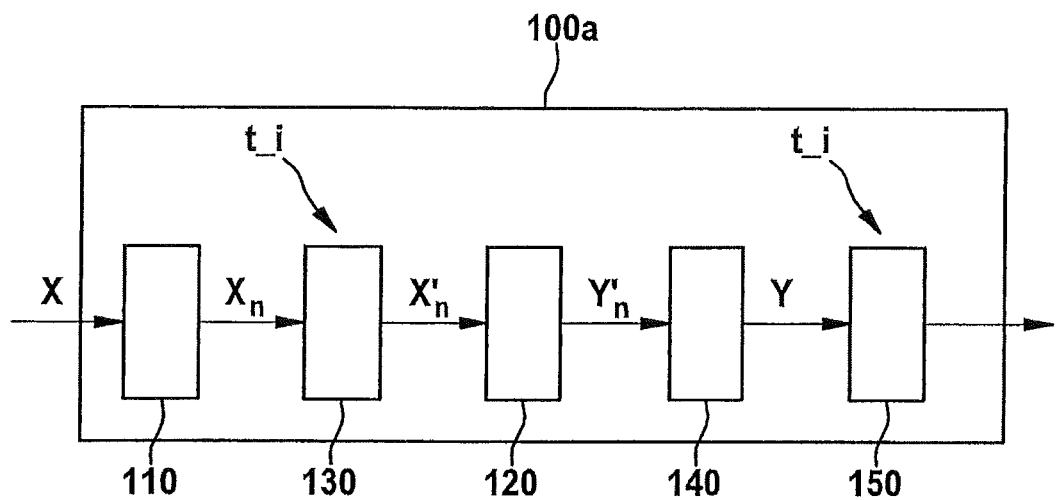
FIG. 7 schematically shows another device according to one specific embodiment.

FIG. 7 shows another specific embodiment of the present invention in which a device 100a for processing data is depicted. On the input side, device 100a once again receives input data X, which, for example in the form of input data words Xn having 4 bits, for example, are relayed by input interface 110 to subsequent encoding unit 130. Encoding unit 130 carries out an encoding according to the present invention (using encoding parameter t_i according to the present invention, also see FIG. 2A), as the result of which encoded input data Xn' are obtained. Encoded input data words Xn' are processed in subsequent processing unit 120, so that processed encoded data words Yn' are obtained at the output of processing unit 120. Data words Yn' are subsequently decoded by unit 140, which represents a decoding unit, so that decoded processed data words Y are obtained which are outputtable via output interface 150 to further units external to device 100.

In yet another specific embodiment, components 120 and 140 according to FIG. 7 are also functionally combinable with one another.

In general, the principle according to the present invention is not limited to an encoding in such a way that the encoded data words, as described above, have a predefinable Hamming distance and/or a predefinable Hamming weight. Rather, as the result of further specific embodiments, encoding unit 130 (FIG. 1, FIGS. 6A, 6B) may alternatively be designed in such a way that it transforms input data words Xn into encoded data words Xn', using a so-called leakage-preserving code, in particular a PLRC. This is achieved, for example, by meeting the threshold value criterion according to the present invention for the difference between measured values Xn1, Xn2 and default value V.

The use of the leakage-preserving code generally has the advantage that data words encoded in this way minimize a leakage of information, which is ascertainable, for example, via physically observable or measurable variables Xn1, Xn2 (for example, measurement of electromagnetic fields, measurement of the electrical energy consumption of device 100 or of unit 120), via the data processed in unit 120. The use of the PLRC according to the present invention has the further advantage that the mapping of the data words onto the encoded data words, which is achieved by the encoding, is even more complex, and therefore more difficult for an attacker to comprehend.

Figure 8:
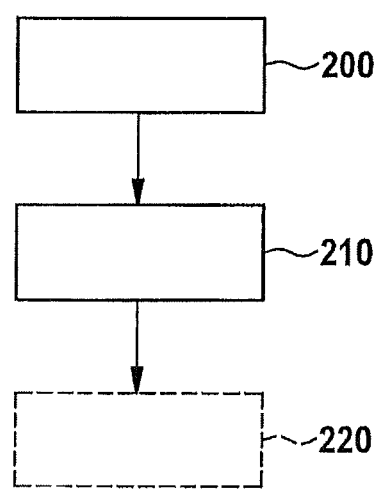
FIG. 8 schematically shows a simplified flow chart of carrying out the method according to the present invention.

FIG. 8 schematically shows a flow chart of one specific embodiment of the method according to the present invention. An encoding of one or multiple input data words Xn with the aid of encoding unit 130 takes place in step 200, using encoding parameter t_i according to the present invention (FIG. 2A). Processing of encoded data words Xn' obtained in step 200 by processing unit 120 takes place in step 210. Optionally, a decoding of processed data words Yn' subsequently takes place in step 220.

The principle according to the present invention, of providing encoded data words Xn' which are subjected to further processing instead of processing unencoded input data Xn, results in the advantage that no random processes or pseudorandom processes are necessary for the DPA hardening (hardening of device 100 against DPA attacks), so that the complexity compared to known methods may be reduced. In addition, device 100 according to the present invention may be implemented, for example, using conventional CMOS cells, whereby device 100 as such may be provided in the form of a monolithic integrated circuit, or also as a circuit component which may be integrated into further circuit units. Another advantage of the present invention is that the proper functioning of device 100 is relatively easy to test, since the present invention is not based on the use of random numbers or pseudorandom numbers.

Furthermore, an implementation of device 100 may be carried out on a relatively small chip surface area. Since the measures according to the present invention which provide hardening against DPA attacks take place on the architecture level, simple reusability in different chip designs, or, in general, designs of devices which are to use the functionality according to the present invention, is possible.

Another aspect of the present invention is provided by a method for operating a device 100 for processing data, device 100 including an input interface 110 for receiving input data, and a processing unit 120 for processing data. According to the present invention, in this further aspect it is provided that data words Xn which are obtained as input data are encoded at input interface 110 with the aid of an encoding unit 130 in order to obtain encoded data words Xn', and that processing unit 120 processes encoded data words Xn', encoding unit 130 using a polymorphous leakage-resilient code for the encoding. Accordingly, the core of this aspect of the present invention is the provision of an encoding of the data words before they are processed, using encoding parameter t_i according to the present invention, which allows a further improved reduction, or complete avoidance, of leakage in the cryptographic sense during the processing of the encoded data words by device 100.

The present invention may advantageously be implemented in hardware as well as in software, or a combination of both.

In general, due to providing encoding unit 130 (FIG. 1), the principle according to the present invention allows a transformation of input data Xn into encoded data Xn' which represent a so-called leakage-preserving code, in particular a PLRC, which is less susceptible to DPA attacks. In other words, the code containing encoded data words Xn' has less leakage in the cryptographic sense. This is equivalent to the statement that no, or only very little, side channel information is contained in the encoded data words.

For this reason, an attacker of device 100 according to the present invention, using measures known per se, such as detecting electromagnetic radiation of device 100 or detecting its electrical energy consumption, or the like, is able to obtain relatively little or no information about the data which is processed in unit 120.

As already mentioned above, processing unit 120 may execute, for example, a portion of a cryptographic process or algorithm, or also a complete cryptographic process, such as encryption or decryption according to, for example, the AES cryptography standard and/or the formation of a hash value, for example according to the SHA standard, etc.

Simple scalability of the principle according to the present invention is provided in this way.

To save on costs, in another specific embodiment the measure according to the present invention, including components 110, 120, 130, 132, may be provided, for example, only for particularly security-relevant processing units of a cryptographic algorithm. Alternatively, all processing steps of a data processing device may also be hardened using the principle according to the present invention.

Compared to conventional countermeasures against side channel attacks, the countermeasures which are provided according to the present invention and based on encoding have various advantages:

1. Countermeasures based on encoding are deterministic in nature, so that they require a relatively low computational effort, and in particular do not require the provision of random number generators or pseudorandom number generators.

2. An implementation as an integrated circuit, using conventional CMOS cells, is easily possible.

3. Due to the independence from random numbers, testing of device 100 according to the present invention is much easier than testing of devices and methods based on the use of random numbers.

4. For implementation, the countermeasures based on the method according to the present invention require only relatively little chip surface area or less complex codes which must be implemented by encoding unit 130.

5. The principle according to the present invention may advantageously be applied either to individual components of a device to be protected, or to the entire device.

6. The present invention is usable in a modular manner. For example, a DPA-hardened memory register in the form of device 100 according to the present invention may be provided when processing unit 120 is designed, for example, as a simple, i.e., conventional, memory register R1. In this case, configuration 100 according to FIG. 1 may be provided in a modular manner, and also used in larger numbers in a device to be protected.

The measures according to the present invention based on encoding eliminate or prevent to a great extent the leakage of information through side channels.

In another advantageous specific embodiment, it may be provided that the code is designed in such a way that it is possible to partially or completely correct errors in encoded data words which are corrupted, for example in the course of a so-called fault attack. This may be appropriately achieved, for example, by adding additional bits which increase the redundancy.

In another advantageous specific embodiment, it may be provided that processing unit 120 is designed for checking one or multiple encoded data words Xn' as to whether they are valid data words within the meaning of the codes used by the encoding unit. In the configuration according to FIG. 7, in addition to unit 120 such a check may also take place in unit 140. For example, in the case of an encoding by encoding unit 130 involving a constant Hamming weight (for example, all encoded data words Xn' have a constant Hamming weight), processing unit 120 may check whether an encoded data word Xn' supplied to it actually has the Hamming weight in question. If not, it may be concluded that, for example, a so-called fault injection attack has been carried out on device 100, in which an attacker has intentionally injected incorrect code words, for example into the connection between components 130 and 120, to allow a more efficient DPA attack. The checking according to the present invention of encoded data words Xn' in unit 120 or 160, for example, may prevent this. In one advantageous specific embodiment, the above-described checking may take place, for example, with the aid of a so-called membership test for encoded data words.

Further advantageous specific embodiments are described below.

Based on investigations by the applicant, a side channel leakage allows conclusions to be drawn concerning data Xn' processed internally in device 100, and thus allows the determination, for example, of a cryptographic key which is secret per se. In other words, a side channel leakage contains information about the internally processed data. One example of such is the data-dependent current consumption in CMOS circuits, as indicated by measured value X1n in the above specific embodiments of device 100.

Side channel leakage L from an internal variable v of device 100 may be defined as a function f( ) of this variable v, as follows: $L=f(v)$.

One practical example of variable v would be an output value of the SubBytes block cipher of the AES. Practical examples of function f(v) would be, for example, the measured current consumption, the measured electromagnetic radiation, but also abstracted properties such as the Hamming weight (HW) or Hamming distance (HD) of v while variable v is processed or stored by device 100. Although the two latter examples, HW and HD, are abstract, they ultimately result in a data-dependent physical behavior of device 100, for example, a data-dependent current consumption.

In addition, an average value M of side channel leakage L may be defined for all possible values of variable $v \in V$, as follows: M=mean (L), as well as a compatible norm $\|v\|$ (absolute value function M in the example).

A mapping C: w←v is now defined which maps a word $w_i$ onto a code word $v_i$, in which the following applies:

$\|f(c_i)-M\| \leq$ epsilon, where epsilon denotes a predefinable limiting value (threshold).

In another specific embodiment, the inequality $\|f(c_i)-M\| \leq$ epsilon does not have to be valid for all values of v; rather, it is sufficient if, for example, a portion of the values of v meets this requirement.

As the result of one specific embodiment, the above-described mapping C: w←v is referred to as so-called leakage-resilient code, since the variation in data-dependent side channel leakage $f(v)=L$ remains within the epsilon loop having the width 2*epsilon.

According to the present invention, a leakage-resilient code may be further improved by executing an encoding rule for the encoding of data words Xn (FIG. 2A) as a function of at least one encoding parameter t_i, so that the mapping C: w←v which represents the encoding is additionally carried out as a function of the at least one encoding parameter t_i. Such an improved code according to the present invention may also be referred to as polymorphic leakage-resilient code, and defined as a function as follows: $C_{PLRC}$: (w, t_i)←v, where C(w, t_i)≠C(w, t_j) for all i≠j.

The above-described working principle of the PLRC is explained in greater detail below with reference to device 100a according to FIG. 7. Polymorphous control unit 132 (see FIG. 2A) controls the selection of a certain code variant (FIGS. 6A, 6B) by specifying encoding parameter t_i to encoding unit 130, so that the specific mapping, representing an encoding, of data words Xn to produce encoded data words Xn' is a function of encoding parameter t_i. Data words Xn' encoded in this way are then supplied to unit 120, which may have side channel leakage L( ). Since the PLRC used according to the present invention by encoding unit 130 is a so-called leakage-resilient code, based on a nonzero side channel leakage L( ) from unit 120, it is not possible to carry out a successful side channel attack. Unit 120 outputs processed data Y, which as the result of one specific embodiment are decoded by a decoding unit 150. Encoding parameter t_i is also particularly advantageously supplied to decoding unit 150 to allow decoding of processed data Y. Encoding parameter t_i may, for example, also be supplied to decoding unit 150 directly from control unit 132 (FIG. 2A).

In another specific embodiment, it may be provided that encoding unit 130 (FIG. 2A) encodes only a portion of all data words Xn. This means that all data words do not necessarily have to be encoded.

Two additional examples are provided below to further clarify the above statements.

Example 1

L=f(V') is the data-dependent current consumption of a cryptographic circuit (for example, a component of device 100 according to FIG. 2A), and is measured as the voltage drop across a shunt resistor (the customary procedure in a side channel attack). Epsilon is now advantageously selected in such a way that it is less than the quantization error of the digital storage oscilloscope used for measuring the voltage drop (i.e., epsilon is virtually no longer measurable). A leakage-preserving code is then a code in which, for any value v' of V', data-dependent current consumption f(V') does not deviate from the average current consumption by more than the value of epsilon when $|f(v)-M| \leq$ epsilon applies.

Example 2

As the result of another specific embodiment, a code used by encoding unit 130 has a constant Hamming weight (HW) of 2; i.e., all values Xn' have an HW=2. If function f(V') is selected in such a way that it gives the Hamming weight from values v' of V', and if an epsilon is selected to be equal to zero, the indicated code is a leakage-preserving code, since $|f(v)-M| \leq$ epsilon applies, due to the fact that average value M for the Hamming weight of the code words is 2, and none of the code words deviates from this value by more than the selected epsilon (=0) ($|Hw(v')-2| \leq 0$ for all v', since $Hw(v')=2$ for all v').

What is claimed is:
1. A device for processing data, comprising:
an input interface for receiving input data;

a processing unit for processing data; and an encoding unit for encoding data words which are obtained as input data at the input interface to obtain encoded data words, wherein the encoding unit is configured to encode the data words so that a predefined portion of measured values which characterize at least one of the encoded data words and processing of the encoded data words by the device has a difference from a default value, the measured values being ascertained as a function of at least one physical variable of the device, and the difference being less than or equal to a predefined threshold value, and wherein the encoding unit executes an encoding rule for encoding the data words as a function of at least one encoding parameter, and wherein the processing unit processes the encoded data words;

wherein due to the encoding parameter, at least one additional degree of freedom is provided in a mapping of the data words onto the encoded data words, wherein the default value is selected to be an average value over all possible values of the measured values, and wherein a different threshold value is provided for each of at least two measured values or data words associated with the two measured values, and wherein the following are satisfied: a) the measured values one of (i) are scalar variables, (ii) are vectorial variables, or (iii) have a matrix form; b) the measured values represent an electrical energy consumption of one of the device or at least one component of the device; and c) the measured values represent one of a Hamming weight or a Hamming distance.

2. The device as recited in claim 1, further comprising:
a polymorphous control unit configured to specify the at least one encoding parameter for encoding at least one data word.

3. The device as recited in claim 2, wherein the processing unit includes at least one of (i) a register for at least temporarily storing at least one encoded data word, and (ii) a cryptographic unit for carrying out at least a portion of a cryptographic process.

4. The device as recited in claim 2, wherein the encoding unit is configured for encoding the data words by adding a predefined number of bits to each data word as a function of the at least one encoding parameter.

5. The device as recited in claim 4, wherein the encoding unit is configured for selecting the predefined number of added bits in such a way that a predefined portion of all encoded data words has at least one of a predefined Hamming distance and a predefined Hamming weight among each other.

6. The device as recited in claim 4, wherein the device is configured, at least in part, as a CMOS integrated circuit.

7. The device as recited in claim 4, wherein the processing unit includes a data bus.

8. A method for operating a device for processing data, the device including an input interface for receiving input data, and a processing unit for processing data, the method comprising:

encoding, with the aid of an encoding unit, data words which are obtained as input data at the input interface to obtain encoded data words, wherein the encoding unit encodes the data words so that a predefined portion of measured values which characterize at least one of the encoded data words and processing of the encoded data words by the device has a difference from a default value, the measured values being ascertained as a function of at least one physical variable of the device, and the difference being less than or equal to a predefined threshold value, and wherein the encoding unit executes an encoding rule for encoding the data words as a function of at least one encoding parameter, and wherein the processing unit processes the encoded data words;

wherein due to the encoding parameter, at least one additional degree of freedom is provided in a mapping of the data words onto the encoded data words, wherein the default value is selected to be an average value over all possible values of the measured values, and wherein a different threshold value is provided for each of at least two measured values or data words associated with the two measured values, and wherein the following are satisfied: a) the measured values one of (i) are scalar variables, (ii) are vectorial variables, or (iii) have a matrix form; b) the measured values represent an electrical energy consumption of one of the device or at least one component of the device; and c) the measured values represent one of a Hamming weight or a Hamming distance.

9. The method as recited in claim 8, further comprising:
performing a calibration in which a predefined calibration data words are processed by the processing unit; and
ascertaining measured values which correspond to the calibration data words.

10. The method as recited in claim 9, wherein the encoding by the encoding unit takes place as a function of measured values which correspond to the calibration data words.

* * * * *